United States Patent
Loccufier et al.

(10) Patent No.: US 9,701,856 B2
(45) Date of Patent: Jul. 11, 2017

(54) LOW MIGRATION FREE RADICAL RADIATION CURABLE INKJET INKS

(71) Applicant: AGFA GRAPHICS NV, Mortsel (BE)

(72) Inventors: Johan Loccufier, Mortsel (BE); Roel De Mondt, Mortsel (BE)

(73) Assignee: AGFA GRAPHICS NV, Mortsel (BE)

( * ) Notice: Subject to any disclaimer, the term of this patent is extended or adjusted under 35 U.S.C. 154(b) by 0 days.

(21) Appl. No.: 14/420,059

(22) PCT Filed: Aug. 13, 2013

(86) PCT No.: PCT/EP2013/066936
§ 371 (c)(1),
(2) Date: Feb. 6, 2015

(87) PCT Pub. No.: WO2014/032968
PCT Pub. Date: Mar. 6, 2014

(65) Prior Publication Data
US 2015/0203696 A1  Jul. 23, 2015

Related U.S. Application Data

(60) Provisional application No. 61/696,304, filed on Sep. 4, 2012.

(30) Foreign Application Priority Data

Aug. 31, 2012 (EP) .................... 12182522

(51) Int. Cl.
| | | |
|---|---|---|
| C09D 11/107 | (2014.01) |
| C09D 11/101 | (2014.01) |
| C09D 11/38 | (2014.01) |
| C09D 11/30 | (2014.01) |

(52) U.S. Cl.
CPC .......... *C09D 11/107* (2013.01); *C09D 11/101* (2013.01); *C09D 11/30* (2013.01); *C09D 11/38* (2013.01); *Y10T 428/24802* (2015.01)

(58) Field of Classification Search
CPC ..... C09D 11/30; C09D 11/101; C09D 11/107; Y10T 428/24802
See application file for complete search history.

(56) References Cited

U.S. PATENT DOCUMENTS

| | | | |
|---|---|---|---|
| 2008/0045618 A1 | 2/2008 | Nagvekar | |
| 2009/0000508 A1 | 1/2009 | Edison et al. | |
| 2010/0105795 A1* | 4/2010 | Maandi | C08F 222/1006 522/48 |
| 2010/0331478 A1* | 12/2010 | Claes | C09D 11/101 524/560 |
| 2015/0116425 A1* | 4/2015 | De Meutter | B41M 7/02 347/40 |
| 2015/0124032 A1* | 5/2015 | De Mondt | B41M 5/0023 347/102 |

FOREIGN PATENT DOCUMENTS

| | | |
|---|---|---|
| EP | 0 997 508 A1 | 5/2000 |
| EP | 1 505 090 A1 | 2/2005 |
| EP | 1 616 921 A1 | 1/2006 |
| EP | 2 161 264 A1 | 3/2010 |
| WO | 2006/083344 A2 | 8/2006 |
| WO | 2009/053348 A1 | 4/2009 |
| WO | 2009/147057 A1 | 12/2009 |
| WO | 2010/069758 A1 | 6/2010 |
| WO | 2010/133381 A1 | 11/2010 |

OTHER PUBLICATIONS

Official Communication issued in International Patent Application No. PCT/EP2013/066936, mailed on Oct. 4, 2013.

* cited by examiner

*Primary Examiner* — Betelhem Shewareged
(74) *Attorney, Agent, or Firm* — Keating and Bennett, LLP

(57) ABSTRACT

A free radical radiation curable inkjet ink having a viscosity smaller than 30 mPa·s at 40° C. and at a shear rate of 1,000 $s^{-1}$ includes a polymeric or polymerizable photoinitiator; a thiol compound; and a vitrification control monomer. The vitrification control monomer includes a (meth)acrylate group and an ethylenically unsaturated functional group selected from the group consisting of a vinyl ether group, an allyl ether group, and an allyl ester group, and the thiol compound includes no more than six thiol groups.

16 Claims, No Drawings

LOW MIGRATION FREE RADICAL RADIATION CURABLE INKJET INKS

CROSS-REFERENCE TO RELATED APPLICATIONS

This application is a 371 National Stage Application of PCT/EP2013/066936, filed Aug. 13, 2013. This application claims the benefit of U.S. Provisional Application No. 61/696,304, filed Sep. 4, 2012, which is incorporated by reference herein in its entirety. In addition, this application claims the benefit of European Application No. 12182522.8, filed Aug. 31, 2012, which is also incorporated by reference herein in its entirety.

BACKGROUND OF THE INVENTION

1. Field of the Invention

The present invention relates to a free radical radiation curable inkjet ink suitable for digital food packaging printing.

2. Description of the Related Art

Short run packaging printing is shifting from conventional printing techniques, such as offset printing, to digital printing, where inkjet is one of the preferred technologies. In inkjet printing, tiny drops of ink are projected directly onto an ink-receiver surface without physical contact between the printing device and the ink-receiver. The printing device stores the printing data electronically and controls a print head for ejecting the drops image-wise on an ink-receiver. Within ink jet for digital packaging printing, there is a clear evolution towards higher image quality and higher printing speeds. In order to satisfy these demands, a new print head design is required. These print heads require a specific ink design as they only can operate with very low viscous inks. The inks for high resolution, high speed short run digital packaging printing have to combine low viscosity, high curing speed and low migrating properties after curing.

Polymeric photoinitiators are known to improve the low migrating properties after curing, but also to increase the viscosity. Even polymeric photoinitiators with a compact design, like the hyperbranched photoinitiators disclosed by EP 1616921 A (AGFA), generally increase the viscosity of radiation curable compositions too much for the new print head designs.

Polymerizable photoinitiators are also known to improve the low migrating properties after curing. For example, EP 2161264 A (AGFA) discloses polymerizable Norrish Type II photoinitiators having a benzophenone group or a thioxanthone group in inkjet inks that exhibit low extractable amounts of the photoinitiators and their residues after curing.

In order to meet the demands for very low viscosity the amount of multifunctional monomers and oligomers have to be minimized. As a result, it becomes increasingly more difficult to avoid small amounts of residual unreacted monomers. These residual monomers are capable of migrating through especially low barrier substrates, typically polyolefines in general and polyethylene and biaxial oriented polypropylene more specifically or cause set off to the back side of substrates when prints are stored on roll.

Particularly interesting monomers for obtaining low viscous ink jet inks have been described in EP 0997508 A (AGFA) disclosing radiation curable ink compositions comprising radiation curable monomers containing vinylether and (meth)acrylate functions.

Radiation curable monomers containing vinylether and (meth)acrylate functions have further been disclosed as preferred diluents for food compliant radiation curable ink jet inks in WO 2010/069758 A (AGFA), WO 2010/133381 A (AGFA), and WO 2009/147057 A (AGFA).

US 2008045618 (HEXION) discloses a low viscosity hybrid curable ink comprising a vinyl ether component, a mono-acrylate component, a photocation polymerization initiator, and a free-radical photoinitiator, wherein the low viscosity ink formulation is free of epoxy functional monomer.

The rate and the completeness of a polymerization can be influenced through the type and concentration of monofunctional and polyfunctional monomers in an ink.

Monofunctional monomers have only one polymerizable functional group for taking part in the polymerization process and usually also exhibit a lower viscosity, whereby the polymerization can continue for a longer time than polyfunctional monomers, but at the end results in a certain amount of unreacted monomers trapped in the polymerized layer. Generally, polyfunctional monomers have larger probability of taking part in the polymerization because they have two or more polymerizable functional groups. However, because they can react more rapidly and frequently, vitrification of the layer occurs much faster leading to unreacted polyfunctional monomers getting trapped in the polymerized network. These trapped monomers contribute significantly to the extractables which limit the possibilities for inkjet printing food packaging applications.

WO 2009/053348 A (AGFA) discloses monomers for low viscous radiation curable ink jet inks for food packaging, comprising at least one acrylate and at least one free radical polymerizable group selected from the group consisting of a vinyl ether, an allyl ether and an allyl ester. By using polyfunctional monomers having polymerizable groups of a different reactivity, the vitrification can be controlled in a better manner during polymerization. Such monomers are sometimes referred to by the skilled person as vitrification control monomers.

However, it has been found that these vitrification control monomers as disclosed by WO 2009/053348 A (AGFA) are particularly prone to migrate through polyolefine substrates such as polyethylene or biaxial oriented polypropylene or even very thin PET foils, especially in low viscous compositions.

WO 2006/083344 (HENKEL) discloses viscous radiation curable compositions comprising (a) at least one (meth)acrylate; (b) at least one thiol component; (c) at least one organic acid present in a stabilizing amount; and (d) at least one curing initiator. The high viscosity can be directly deduced from paragraph [0044] since the diluent desirably has already a viscosity of about 50-500 mPa·s.

US 2009/000508 A (HEXION) discloses radiation curable inkjet inks comprising a radiation curable composition comprising about 0.1 to about 15 wt. % of an ethylenically unsaturated monofunctional monomer, about 30 to about 80 wt. % of an ethylenically unsaturated difunctional monomer, 0 to about 15 wt. % of an ethylenically unsaturated polyfunctional monomer, and 0 to about 15 wt. % of an ethylenically unsaturated urethane oligomer; a pigment dispersion; and a polymerization initiator; wherein the ink when containing ethylenically unsaturated urethane oligomer has an activation energy of fluidization of about 7 to 26 kJ/mol at a shear rate of about 1 to about 100,000 sec$^{-1}$ and a temperature of about 25 to about 50° C.

EP1505090 A (NIPPON SHOKUBAI) discloses an activated energy ray-curable ink composition for ink-jet printing use, which contains a reactive diluent containing a vinyl ether group-containing (meth)acrylic ester and a hydroxyl group-containing polymerizable compound.

SUMMARY OF THE INVENTION

Therefore, there remains a need for concepts leading to higher monomer conversion in ultra low viscous inks upon curing that can be integrated into the ink jet ink without significantly increasing the ink viscosity.

In order to overcome the problems described above, preferred embodiments of the present invention provide a free radical radiation curable inkjet ink as defined below.

It was found that by using a specific combination of a polymeric or polymerizable photoinitiator; a thiol compound; and a (meth)acrylate monomer comprising an ethylenically unsaturated functional group selected from the group consisting of a vinyl ether group, an allyl ether group and an allyl ester group that free radical inks could be prepared which after curing exhibited low amounts of extractables while maintaining a very low viscosity.

Furthermore, it was surprisingly found that for a same molar concentration of thiol groups in a free radical radiation curable inkjet ink that the amount of extractables could be further reduced by using compounds including multiple thiol groups while a very low viscosity could be maintained.

Another surprising effect was that no odor was perceivable from cured layers of the free radical radiation curable inkjet inks according to preferred embodiments of the invention. This is surprising because many thiols have strong odors resembling that of garlic. Thiols are also used as odorants to assist in the detection of leaks of natural gas which in pure form is odorless. In addition also no or only minor odor from uncured acrylate monomers was perceivable.

Further advantages and benefits of the invention will become apparent from the description hereinafter.

DETAILED DESCRIPTION OF THE PREFERRED EMBODIMENTS

Definitions

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_1$ to $C_6$-alkenyl group.

Unless otherwise specified a substituted or unsubstituted alkynyl group is preferably a $C_1$ to $C_6$-alkynyl group.

Unless otherwise specified a substituted or unsubstituted aralkyl group is preferably a phenyl or naphthyl group including one, two, three or more $C_1$ to $C_6$-alkyl groups.

Unless otherwise specified a substituted or unsubstituted alkaryl group is preferably a $C_7$ to $C_{20}$-alkyl group including a phenyl group or naphthyl group.

Unless otherwise specified a substituted or unsubstituted aryl group is preferably a phenyl group or naphthyl group Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more constituents selected from the group consisting of methyl, ethyl, n-propyl, isopropyl, n-butyl, isobutyl and tertiary-butyl, ester, amide, ether, thioether, ketone, aldehyde, sulfoxide, sulfone, sulfonate ester, sulphonamide, —Cl, —Br, —I, —OH, —SH, —CN and —$NO_2$.

Free Radical Radiation Curable Inkjet Inks

A free radical radiation curable inkjet ink in a preferred embodiment of the present invention has a viscosity smaller than 30 mPa·s at 40° C. and at a shear rate of 1,000 $s^{-1}$ and includes a polymeric or polymerizable photoinitiator; a thiol compound; and a vitrification control monomer, wherein the vitrification control monomer includes a (meth)acrylate group and an ethylenically unsaturated functional group selected from the group consisting of a vinyl ether group, an allyl ether group and an allyl ester group; and wherein the thiol compound includes no more than six thiol groups, preferably no more than four thiol groups, and most preferably no more than three thiol groups.

If the thiol compound includes more than six thiol groups, the free radical radiation curable inkjet ink obtains a too high viscosity.

In a preferred embodiment, the vitrification control monomer includes an acrylate group and an ethylenically unsaturated functional group selected from the group consisting of a vinyl ether group, an allyl ether group and an allyl ester group.

The free radical radiation curable inkjet ink preferably includes 60 to 95 wt % of polymerizable compounds, more preferably 70 to 90 wt % of polymerizable compounds based upon the total weight of the radiation curable inkjet ink. A colourless free radical radiation curable inkjet ink, i.e. a jettable radiation curable varnish, may include up to 99 wt % of polymerizable compounds based upon the total weight of the jettable radiation curable varnish.

In a preferred embodiment, the vitrification control monomer represents at least 50% by weight of the total monomer composition. In a more preferred embodiment the vitrification control monomer at least 70% by weight of the total monomer composition. In the most preferred embodiment, the vitrification control monomer represents at least 80% by weight of the total monomer composition.

In a preferred embodiment, the free radical radiation curable inkjet ink includes a polymerizable composition consisting essentially of:

a) 40-100 wt %, preferably 50-95 wt % of one or more vitrification control monomers A;

b) 0-55 wt % of one or more polymerizable compounds B selected from the group consisting of monofunctional acrylates and difunctional acrylates; and c) 0-55 wt % of one or more polymerizable compounds C selected from the group consisting of trifunctional acrylates, tetrafunctional acrylates, pentafunctional acrylates and hexafunctional acrylates, with the proviso that if the weight percentage of compounds B>24 wt %, then the weight percentage of compounds C>1 wt %; and wherein all weight percentages of A, B and C are based upon the total weight of the polymerizable composition.

The static surface tension of the free radical radiation curable inkjet ink is preferably from 20 to 40 mN/m, more preferably from 22 to 35 mN/m. It is preferably 20 mN/m or more from the viewpoint of printability by another radiation curable inkjet ink, and it is preferably not more than 30 mN/m from the viewpoint of the wettability of the ink-receiving substrate.

The free radical radiation curable inkjet ink preferably also contains at least one surfactant so that the dynamic surface tension is no more than 30 mN/m measured by maximum bubble pressure tensiometry at a surface age of 50 ms and at 25° C.

For having a good ejecting ability and fast inkjet printing, the viscosity of the free radical radiation curable inkjet ink at the temperature of 40° C. is smaller than 30 mPa·s, preferably smaller than 20 mPa·s, more preferably smaller than 15 mPa·s, and most preferably between 1 and 12 mPa·s all at a shear rate of 1,000 s$^{-1}$. A preferred jetting temperature is between 10 and 70° C., more preferably between 25 and 50° C., and most preferably between 35 and 45° C.

The radiation curable inkjet ink according to a preferred embodiment of the present invention is a free radical polymerizable composition. It was found in industrial inkjet printing systems that cationically curable inkjet inks posed problems of jetting reliability due to UV stray light. UV stray light hitting the nozzle plate of an inkjet print head results into failing nozzles due to clogging by cured ink in the nozzle. Unlike free radical ink where radical species have a much shorter lifetime, the cationic curable ink continues to cure once an acid species has been generated by UV light in the nozzle.

The free radical radiation curable inkjet ink preferably does not include an organic acid. Cationic polymerization is based on an initiation by an organic acid. As shown in EP 0997508 A (AGFA), the vitrification control monomer including a vinyl ether group can also be cured by cationic polymerization. This results in an undesirable viscosity increase, which is often also observed on storage of the ink.

The free radical radiation curable inkjet ink is preferably part of a radiation curable inkjet ink set. Such a curable ink set preferably includes at least one yellow curable ink (Y), at least one cyan curable ink (C) and at least one magenta curable ink (M) and preferably also at least one black curable ink (K). The curable CMYK-ink set may also be extended with extra inks such as red, green, blue, green and/or orange to further enlarge the colour gamut. The CMYK ink set may also be extended by the combination of full density inkjet inks with light density inkjet inks. The combination of dark and light colour inks and/or black and grey inks improves the image quality by a lowered graininess.

With the exception of a polymeric dispersant and a polymeric photoinitiator, the free radical radiation curable inkjet ink preferably does not include a polymer. Inkjet inks of very low viscosity can be made if no polymer is present in the inkjet ink. The free radical radiation curable inkjet ink preferably includes no more than 15 wt %, more preferably no more than 10 wt % and most preferably no more than 5 wt % of polymer based on the total weight of the inkjet ink.

In a preferred embodiment, the free radical radiation curable inkjet ink includes a polymer other than a polymeric dispersant and/or a polymeric photoinitiator in an amount of 0 to 3 wt %, preferably 0 to 2 wt %, and most preferably 0 to 1 wt % based on the total weight of the inkjet ink.

Thiol Compounds

The free radical radiation curable inkjet ink in a preferred embodiment of the present invention contains a thiol compound including no more than six thiol groups, preferably no more than four thiol groups, and most preferably no more than three thiol groups.

The thiol compound according to a preferred embodiment of the present invention is preferably a compound comprising an aliphatic thiol. Aliphatic thiols tend to exhibit a smaller viscosity in the inkjet ink.

In a more preferred embodiment, the thiol compound is represented by Formula (I):

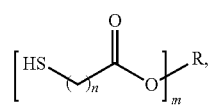

Formula (I)

wherein n represents an integer from 1 to 4; m represents an integer from 1 to 6; and R represents an m-valent linking group comprising at most 20 carbon atoms.

In a preferred embodiment n represents 1 or 2.

In a preferred embodiment m represents 2 or 3.

In a more preferred embodiment n represents 1 or 2 and m represents an integer from 1 to 4. In the most preferred embodiment n represents 1 or 2 and m represents 2 or 3.

Particularly preferred thiol compounds according to a preferred embodiment of the present invention are given by Table 1, without being limited thereto.

TABLE 1

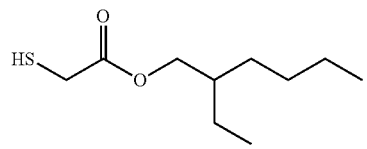

Thiol-1

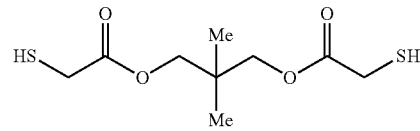 [SMILES: CC(C)(COC(=O)CS)COC(=O)CS]

Thiol-2

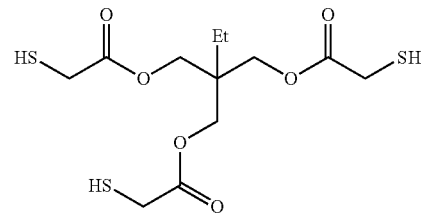 [SMILES: CCC(COC(=O)CS)(COC(=O)CS)COC(=O)CS]

Thiol-3

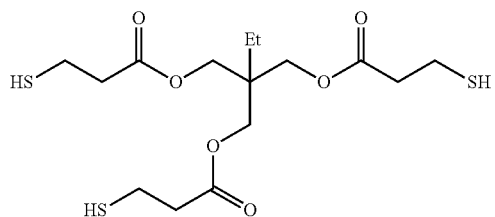 [SMILES: CCC(COC(=O)CCS)(COC(=O)CCS)COC(=O)CCS]

Thiol-4

TABLE 1-continued

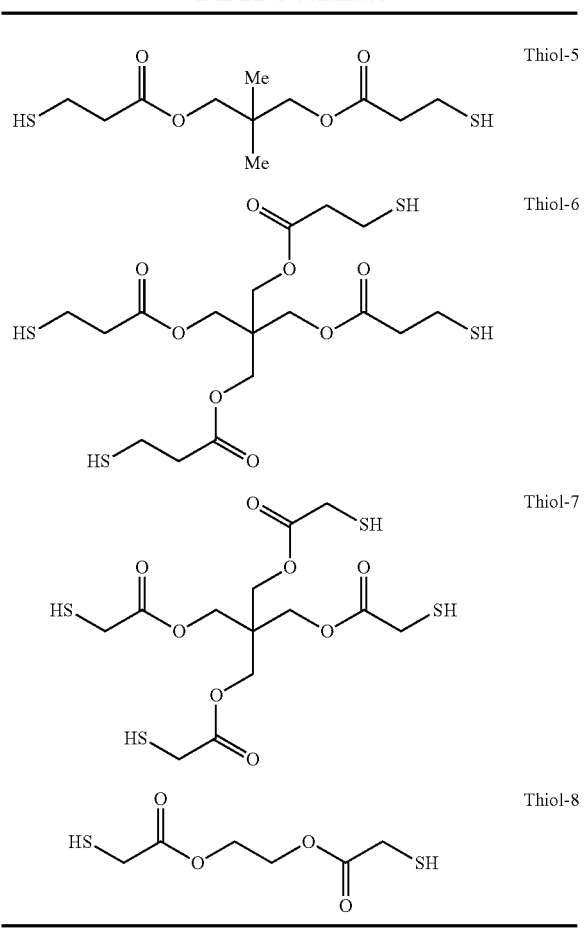

In a preferred embodiment, the free radical radiation curable inkjet ink includes 0.25 to 20% by weight of the thiol compound, more preferably 1 to 10% by weight and most preferably 2 to 5% by weight all based on the total weight of the free radical radiation curable inkjet ink.

Preferred commercially available thiol compounds are 2-ethylhexyl thioglycolate and ethylene glycol bisthioglycolate available from Aldrich; Thiocure™ GDMP, Thiocure™ TMPMA and Thiocure™ PETMA available from Bruno Bock GmbH.

In a preferred embodiment, the thiol compound has a molecular weight smaller than 1,000 Dalton, more preferably the thiol compound has a molecular weight smaller than 500 Dalton.

Vitrification Control Monomers

The free radical radiation curable inkjet ink includes a vitrification control monomer includes a (meth)acrylate group and an ethylenically unsaturated functional group selected from the group consisting of a vinyl ether group, an allyl ether group and an allyl ester group In a preferred embodiment, the vitrification control monomer comprises at least one acrylate group and at least one ethylenically unsaturated group selected from the group consisting of a vinyl ether, an allyl ether and an allyl ester, a vinyl ether and an allyl ether being more preferred, a vinyl ether being the most preferred.

In a more preferred embodiment the vitrification control monomer is a monomer represented by Formula (II):

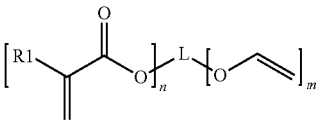

Formula (II)

wherein, $R^1$ represents hydrogen, or a substituted or unsubstituted alkyl group, preferably a methyl group;

L represents a linking group comprising at least one carbon atom; and n and m independently represent a value from 1 to 5.

In a preferred embodiment, the compound according to Formula (II) has $R^1$ representing hydrogen and n representing a value of 1. The value of m is preferably 1, 2 or 3. L preferably comprises 2, 3 or 4 carbon atoms.

Preferred vinylether acrylates are those disclosed in U.S. Pat. No. 6,310,115 (AGFA), incorporated herein by reference. Particularly preferred compounds are 2-(2-vinyloxyethoxy)ethyl (meth)acrylate, most preferably the compound is 2-(2-vinyloxyethoxy)ethyl acrylate.

Other suitable vinylether (meth)acrylates are those disclosed in columns 3 and 4 of US 67679890 B (NIPPON SHOKUBAI), incorporated herein by specific reference.

The vinylether acrylates can be prepared according to standard synthetic methods known to those skilled in the art of organic synthesis. Suitable synthetic methods are disclosed in U.S. Pat. No. 6,310,115 (AGFA) and US 67679890 B (NIPPON SHOKUBAI).

A single compound or a mixture of vinylether acrylates may be used.

A free radical radiation curable inkjet ink in a preferred embodiment of the present invention includes the vinylether (meth)acrylate preferably in an amount of at least 25 wt %, more preferably at least 30 wt % and most preferably at least 40 wt % based upon the total weight of the radiation curable composition used in the free radical radiation curable inkjet ink.

Particularly preferred vitrification monomers are given in Table 2 without being limited thereto.

TABLE 2

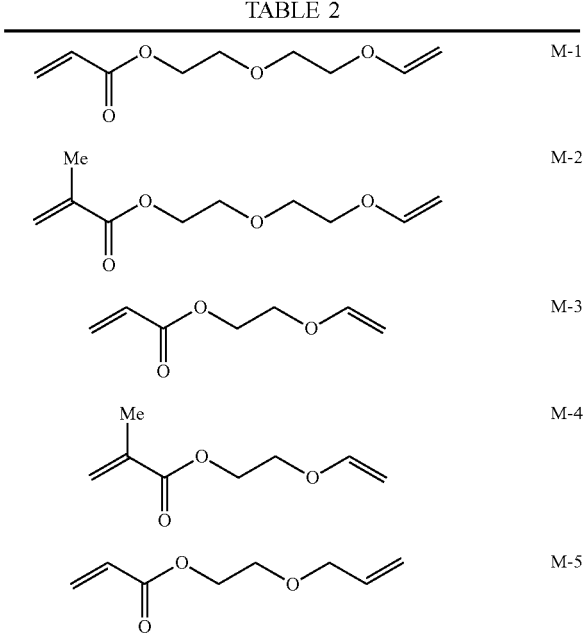

TABLE 2-continued

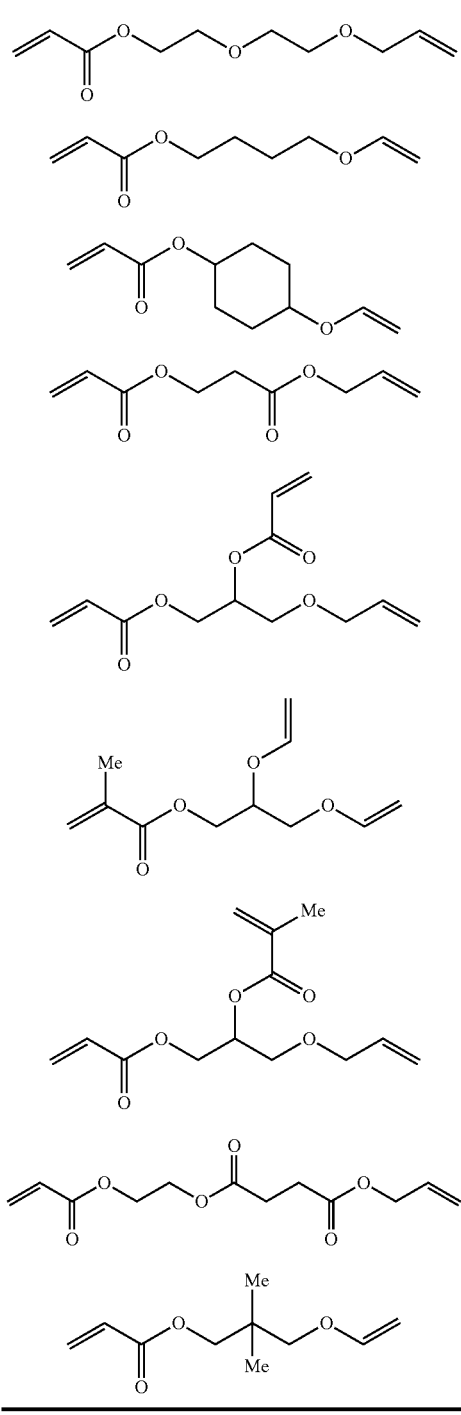

Other Monomers

Any monomer capable of free radical polymerization may be used in addition to the vitrification control monomer. A combination of monomers may also be used. The monomers may possess different degrees of functionality, and a mixture including combinations of mono-, di-, tri- and higher functionality monomers may be used. The viscosity of the radiation curable inkjet ink can be adjusted by varying the ratio between the monomers.

The monomers used, especially for food packaging applications, are preferably purified compounds having no or almost no impurities, more particularly no toxic or carcinogenic impurities. The impurities are usually derivative compounds obtained during synthesis of the polymerizable compound. Sometimes, however, some compounds may be added deliberately to pure polymerizable compounds in harmless amounts, for example, polymerization inhibitors or stabilizers.

Particularly preferred monomers and oligomers are those listed in [0106] to [0115] in EP 1911814 A (AGFA).

For achieving high printing speeds, monomers other than the vitrification control monomers are preferably low viscous monomers so that a low viscosity for the free radical radiation curable inkjet ink can be obtained.

A popular low viscosity monofunctional monomer is tetrahydrofurfuryl (meth)acrylate. However, in industrial inkjet printing also a high reliability is required which allows the incorporation of the inkjet printing system into a production line.

It was found that a vessel of tetrahydrofurfuryl acrylate kept at 40° C. for 100 hours lost 40% of its weight. Printing heads in the present method preferably operate at temperatures between 35 to 45° C. A high evaporation of tetrahydrofurfuryl (meth)acrylate from a print head nozzle during a stand-by mode from the inkjet printer leads to an unacceptable increase in viscosity of the inkjet ink in the print head and subsequently to jetting failures of the print head (bad latency). The free radical radiation curable inkjet ink preferably uses low viscosity monomers exhibiting small evaporation rates such as vinyl ether(meth)acrylates. For example, 2-(2-vinyloxyethoxy)ethyl acrylate (VEEA) kept at 40° C. for 100 hours loses only 8% of its weight.

In a preferred embodiment, the monomers in the radiation curable inkjet ink lose less than 15% of their weight when kept at 40° C. for 100 hours in an open cubic vessel.

Photoinitiators

The free radical radiation curable inkjet ink contains at least one polymeric or polymerizable photoinitiator, but may contain a photoinitiating system including a plurality of photoinitiators and/or co-initiators.

In a preferred embodiment, the photoinitiator in the free radical radiation curable inkjet ink is a polymerizable photoinitiator. Such a photoinitiator results in a smaller viscosity than a polymeric photoinitiator while still minimizing health risks in food packaging applications.

The photoinitiator in the free radical radiation curable inkjet ink is a free radical initiator, more specifically a Norrish type I initiator or a Norrish type II initiator. A free radical photoinitiator is a chemical compound that initiates polymerization of monomers when exposed to actinic radiation by the formation of a free radical. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or a co-initiator. Both type I and type II photoinitiators can be used in the present invention, alone or in combination. The free radical radiation curable inkjet ink preferably includes no cationic photoinitiator.

The polymerizable photoinitiators may be combined with other type of non-polymeric or non-polymerizable photoinitiators, preferably at concentration levels in the inkjet ink causing no health risks.

Suitable photoinitiators are disclosed in CRIVELLO, J. V., et al. Photoinitiators for Free Radical Cationic and Anionic Photopolymerization. 2nd edition. Edited by BRADLEY, G. London, UK: John Wiley and Sons Ltd, 1998. p. 287-294.

Specific examples of photoinitiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis (2,6-dimethylbenzoyl)-2,4,4-trimethylpentylphosphine oxide, 2,4,6 trimethylbenzoyldiphenylphosphine oxide, 2,4,6-trimethoxybenzoyldiphenylphosphine oxide, 2-methyl-1-[4-(methylthio) phenyl]-2-morpholinopropan-1-one, 2,2-dimethoxy-1, 2-diphenylethan-1-one or 5,7-diiodo-3-butoxy-6-fluorone.

Suitable commercial photoinitiators include Irgacure™ 184, Irgacure™ 500, Irgacure™ 369, Irgacure™ 1700, Irgacure™ 651, Irgacure™ 819, Irgacure™ 1000, Irgacure™ 1300, Irgacure™ 1870, Darocur™ 1173, Darocur™ 2959, Darocur™ 4265 and Darocur™ ITX available from CIBA SPECIALTY CHEMICALS, Lucerin™ TPO available from BASF AG, Esacure™ KT046, Esacure™ KIP150, Esacure™ KT37 and Esacure™ EDB available from LAMBERTI, H-Nu™ 470 and H-Nu™ 470X available from SPECTRA GROUP Ltd.

For a low migration free radical radiation curable inkjet ink, the photoinitiator preferably consists of so-called diffusion hindered photoinitiator. A diffusion hindered photoinitiator is a photoinitiator which exhibits a much lower mobility in a cured layer of the free radical curable inkjet ink than a monofunctional photoinitiator, such as benzophenone. Several methods can be used to lower the mobility of the photoinitiator. One way is to increase the molecular weight of the photoinitiators so that the diffusion speed is reduced, e.g. polymeric photoinitiators. Another way is to increase its reactivity so that it is built into the polymerizing network, e.g. multifunctional photoinitiators (having 2, 3 or more photoinitiating groups) and polymerizable photoinitiators.

The diffusion hindered photoinitiator is preferably selected from the group consisting of non-polymeric multifunctional photoinitiators, oligomeric or polymeric photoinitiators and polymerizable photoinitiators. Non-polymeric di- or multifunctional photoinitiators are considered to have a molecular weight between 300 and 900 Dalton. Non-polymerizable monofunctional photoinitiators with a molecular weight in that range are not diffusion hindered photoinitiators.

Most preferably the photoinitiators in the free radical radiation curable inkjet ink consist of one or more diffusion hindered photoinitiators, preferably one or more polymerizable or polymeric photoinitiators, and more preferably polymerizable photoinitiators.

Preferred diffusion hindered photoinitiators contain one or more photoinitiating functional groups derived from a Norrish type I-photoinitiator selected from the group consisting of benzoinethers, benzil ketals, α,α-dialkoxyacetophenones, α-hydroxyalkylphenones, α-aminoalkylphenones, acylphosphine oxides, acylphosphine sulphides, α-haloketones, α-halosulfones and phenylglyoxalates.

Preferred diffusion hindered photoinitiators contain one or more photoinitiating functional groups derived from a Norrish type II-initiator selected from the group consisting of benzophenones, thioxanthones, 1,2-diketones and anthraquinones.

Suitable diffusion hindered photoinitiators are also those disclosed in EP 2065362 A (AGFA) in paragraphs [0074] and for difunctional and multifunctional photoinitiators, in paragraphs [0077] to [0080] for polymeric photoinitiators and in paragraphs [0081] to [0083] for polymerizable photoinitiators. Other preferred polymerizable photoinitiators are those disclosed in EP 2161264 A (AGFA).

A preferred amount of photoinitiator is 0-50 wt %, more preferably 0.1-20 wt %, and most preferably 0.3-15 wt % of the total weight of the radiation curable inkjet ink.

In a very preferred embodiment, the free radical radiation curable inkjet ink includes a polymerizable or polymeric thioxanthone photoinitiator and an acylphosphine oxide-based polymerization photoinitiator, more preferably a bis (2,4,6-trimethylbenzoyl)-phenylphosphineoxide photoinitiator.

Photoinitiators like bis(2,4,6-trimethylbenzoyl)-phenylphosphineoxide photoinitiator are monofunctional but are allowed by the Swiss ordinance SR 817.023.21 on Objects and Materials due to their very low toxicity level.

In order to increase the photosensitivity further, the free radical radiation curable inkjet ink may additionally contain co-initiators. Suitable examples of co-initiators can be categorized in three groups: 1) tertiary aliphatic amines such as methyldiethanolamine, dimethylethanolamine, triethanolamine, triethylamine and N-methylmorpholine; (2) aromatic amines such as amylparadimethylaminobenzoate, 2-n-butoxyethyl-4-(dimethylamino) benzoate, 2-(dimethylamino)ethylbenzoate, ethyl-4-(dimethylamino) benzoate, and 2-ethylhexyl-4-(dimethylamino)benzoate; and (3) (meth)acrylated amines such as dialkylamino alkyl (meth)acrylates (e.g., diethylaminoethylacrylate) or N-morpholinoalkyl-(meth)acrylates (e.g., N-morpholinoethylacrylate). The preferred co-initiators are aminobenzoates.

When one or more co-initiators are included into the radiation curable inkjet ink, preferably these co-initiators are diffusion hindered for safety reasons.

A diffusion hindered co-initiator is preferably selected from the group consisting of non-polymeric di- or multifunctional co-initiators, oligomeric or polymeric co-initiators and polymerizable co-initiators. More preferably the diffusion hindered co-initiator is selected from the group consisting of polymeric co-initiators and polymerizable co-initiators. Most preferably the diffusion hindered co-initiator is a polymerizable co-initiator having at least one (meth) acrylate group, more preferably having at least one acrylate group.

Some co-initiators, like ethylhexyl-4-dimethylaminobenzoate, are not diffusion hindered co-initiators but are allowed by the Swiss ordinance SR 817.023.21 on Objects and Materials due to their very low toxicity level. In a preferred embodiment, the free radical radiation curable inkjet ink includes ethylhexyl-4-dimethylaminobenzoate as co-initiator.

The free radical radiation curable inkjet ink preferably includes a polymerizable or polymeric tertiary amine co-initiator.

Preferred diffusion hindered co-initiators are the polymerizable co-initiators disclosed in EP 2053101 A (AGFA) in paragraphs [0088] and [0097].

Preferred diffusion hindered co-initiators include a polymeric co-initiator having a dendritic polymeric architecture, more preferably a hyperbranched polymeric architecture. Preferred hyperbranched polymeric co-initiators are those disclosed in US 2006014848 A (AGFA).

The free radical radiation curable inkjet ink preferably includes the (diffusion hindered) co-initiator in an amount of 0.1 to 50 wt %, more preferably in an amount of 0.5 to 25 wt %, most preferably in an amount of 1 to 15 wt % of the total weight of the free radical radiation curable inkjet ink.

Colorants

The free radical radiation curable inkjet ink may be a colourless free radical radiation curable inkjet ink, i.e. a jettable radiation curable varnish, but preferably includes at least one colorant.

The colorant in the free radical radiation curable inkjet ink can be a dye but is preferably a pigment. The pigmented radiation curable ink preferably contains a dispersant, more preferably a polymeric dispersant, for dispersing the pigment. The pigmented radiation curable ink may contain a dispersion synergist to improve the dispersion quality and stability of the ink.

The pigments may be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley-VCH, 2004. ISBN 3527305769.

Preferred pigments are disclosed in paragraphs [0128] to [0138] of WO 2008/074548 (AGFA).

Particularly referred pigments include as red or magenta pigments, Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, 257, Pigment Violet 3, 19, 23, 29, 30, 37, 50, 88, Pigment Orange 13, 16, 20, 36, as blue or cyanogen pigments, Pigment Blue 1, 15, 15:1, 15:2, 15:3, 15:4, 15:6, 16, 17-1, 22, 27, 28, 29, 36, 60, as green pigments, Pigment Green 7, 26, 36, 50, as yellow pigments, Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, 193, as black pigments, Pigment Black 7, 28, 26, as white pigments, Pigment White 6, 18 and 21.

Also mixed crystals may be used. Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions. A commercially available example is Cinquasia™ Magenta RT-355-D from Ciba Specialty Chemicals.

Also mixtures of pigments may be used. For example, the radiation curable inkjet ink includes a black pigment and at least one pigment selected from the group consisting of a blue pigment, a cyan pigment, magenta pigment and a red pigment. It was found that such a black inkjet ink was better readable and scannable on a transparent substrate.

Pigment particles in inkjet inks should be sufficiently small to permit free flow of the ink through the inkjet-printing device, especially at the ejecting nozzles. It is also desirable to use small particles for maximum colour strength and to slow down sedimentation.

The numeric average pigment particle size is preferably between 0.050 and 1 µm, more preferably between 0.070 and 0.300 µm and particularly preferably between 0.080 and 0.200 µm. Most preferably, the numeric average pigment particle size is no larger than 0.200 µm. An average particle size smaller than 0.050 µm is less desirable for decreased fastness, but mainly also because very small pigment particles or individual pigment molecules thereof may still migrate into the food packaging applications. The average particle size of pigment particles is determined with a Brookhaven Instruments Particle Sizer BI90plus based upon the principle of dynamic light scattering. The ink is diluted with ethyl acetate to a pigment concentration of 0.002 wt %. The measurement settings of the BI90plus are: 5 runs at 23° C., angle of 90°, wavelength of 635 nm and graphics=correction function However for white pigment inkjet inks, the numeric average particle diameter of the white pigment is preferably from 50 to 500 nm, more preferably from 150 to 400 nm, and most preferably from 200 to 350 nm. Sufficient hiding power cannot be obtained when the average diameter is less than 50 nm, and the storage ability and the jet-out suitability of the ink tend to be degraded when the average diameter exceeds 500 nm. The determination of the numeric average particle diameter is best performed by photon correlation spectroscopy at a wavelength of 633 nm with a 4 mW HeNe laser on a diluted sample of the pigmented inkjet ink. A suitable particle size analyzer used was a Malvern™ nano-S available from Goffin-Meyvis. A sample can, for example, be prepared by addition of one drop of ink to a cuvette containing 1.5 mL ethyl acetate and mixed until a homogenous sample was obtained. The measured particle size is the average value of 3 consecutive measurements consisting of 6 runs of 20 seconds.

Suitable white pigments are given by Table 2 in [0116] of WO 2008/074548 (AGFA). The white pigment is preferably a pigment with a refractive index greater than 1.60. The white pigments may be employed singly or in combination. Preferably titanium dioxide is used as pigment with a refractive index greater than 1.60. Preferred titanium dioxide pigments are those disclosed in [0117] and in [0118] of WO 2008/074548 (AGFA).

The pigments are preferably present in the range of 0.01 to 15%, more preferably in the range of 0.05 to 10% by weight and most preferably in the range of 0.1 to 8% by weight, each based on the total weight of the pigment dispersion. For white pigment dispersions, the white pigment is preferably present in an amount of 3% to 40% by weight of the pigment dispersion, and more preferably 5% to 35%. An amount of less than 3% by weight cannot achieve sufficient covering power and usually exhibits very poor storage stability and ejection property.

Dispersants

The pigmented radiation curable inkjet ink preferably contains a dispersant, more preferably a polymeric dispersant, for dispersing the pigment. The pigmented radiation curable inkjet ink may contain a dispersion synergist to improve the dispersion quality and stability of the ink.

Suitable polymeric dispersants are copolymers of two monomers but they may contain three, four, five or even more monomers. The properties of polymeric dispersants depend on both the nature of the monomers and their distribution in the polymer. Copolymeric dispersants preferably have the following polymer compositions:

statistically polymerized monomers (e.g. monomers A and B polymerized into ABBAABAB);

alternating polymerized monomers (e.g. monomers A and B polymerized into ABABABAB);

gradient (tapered) polymerized monomers (e.g. monomers A and B polymerized into AAABAABBABBB);

block copolymers (e.g. monomers A and B polymerized into AAAAABBBBBB) wherein the block length of each of the blocks (2, 3, 4, 5 or even more) is important for the dispersion capability of the polymeric dispersant;

graft copolymers (graft copolymers consist of a polymeric backbone with polymeric side chains attached to the backbone); and mixed forms of these polymers, e.g. blocky gradient copolymers.

Suitable polymeric dispersants are listed in the section on "Dispersants", more specifically [0064] to [0070] and to [0077], in EP 1911814 A (AGFA).

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

The polymeric dispersant has preferably a polydispersity PD smaller than 2, more preferably smaller than 1.75 and most preferably smaller than 1.5.

Commercial examples of polymeric dispersants are the following:

DISPERBYK™ dispersants available from BYK CHEMIE GMBH;
SOLSPERSE™ dispersants available from NOVEON;
TEGO™ DISPERS™ dispersants from EVONIK;
EDAPLAN™ dispersants from MÜNZING CHEMIE;
ETHACRYL™ dispersants from LYONDELL;
GANEX™ dispersants from ISP;
DISPEX™ and EFKA™ dispersants from CIBA SPECIALTY CHEMICALS INC;
DISPONER™ dispersants from DEUCHEM; and
JONCRYL™ dispersants from JOHNSON POLYMER.

Particularly preferred polymeric dispersants include Solsperse™ dispersants from NOVEON, Efka™ dispersants from CIBA SPECIALTY CHEMICALS INC and Disperbyk™ dispersants from BYK CHEMIE GMBH. Particularly preferred dispersants are Solsperse™ 32000, 35000 and 39000 dispersants from NOVEON. The polymeric dispersant is preferably used in an amount of 2 to 600 wt %, more preferably 5 to 200 wt %, most preferably 50 to 90 wt % based on the weight of the pigment.

Stabilizers

The free radical curable inkjet ink may contain a polymerization inhibitor. Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used.

Suitable commercial inhibitors are, for example, Sumilizer™ GA-80, Sumilizer™ GM and Sumilizer™ GS produced by Sumitomo Chemical Co. Ltd.; Genorad™ 16, Genorad™ 18 and Genorad™ 20 from Rahn AG; Irgastab™ UV10 and Irgastab™ UV22, Tinuvin™ 460 and CGS20 from Ciba Specialty Chemicals; Floorstab™ UV range (UV-1, UV-2, UV-5 and UV-8) from Kromachem Ltd, Additol™ S range (S100, S110, S120 and S130) from Cytec Surface Specialties.

Since excessive addition of these polymerization inhibitors will lower the ink sensitivity to curing, it is preferred that the amount capable of preventing polymerization is determined prior to blending. The amount of a polymerization inhibitor is preferably lower than 2 wt % of the total weight of the free radical curable inkjet ink.

Surfactants

The free radical curable inkjet ink may contain at least one surfactant. The surfactant can be anionic, cationic, non-ionic, or zwitter-ionic and is usually added in a total quantity less than 3 wt % based on the total weight of the ink and particularly in a total less than 1 wt % based on the total weight of the free radical curable inkjet ink.

Suitable surfactants include fluorinated surfactants, fatty acid salts, ester salts of a higher alcohol, alkylbenzene sulfonate salts, sulfosuccinate ester salts and phosphate ester salts of a higher alcohol (for example, sodium dodecylbenzenesulfonate and sodium dioctylsulfosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

Preferred surfactants are selected from fluoro surfactants (such as fluorinated hydrocarbons) and silicone surfactants. The silicone surfactants are preferably siloxanes and can be alkoxylated, polyether modified, polyether modified hydroxy functional, amine modified, epoxy modified and other modifications or combinations thereof. Preferred siloxanes are polymeric, for example polydimethylsiloxanes.

Preferred commercial silicone surfactants include BYK™ 333 and BYK™ UV3510 from BYK Chemie.

In a preferred embodiment, the surfactant is a polymerizable compound.

Preferred polymerizable silicone surfactants include a (meth)acrylated silicone surfactant. Most preferably the (meth)acrylated silicone surfactant is an acrylated silicone surfactant, because acrylates are more reactive than methacrylates.

In a preferred embodiment, the (meth)acrylated silicone surfactant is a polyether modified (meth)acrylated polydimethylsiloxane or a polyester modified (meth)acrylated polydimethylsiloxane.

Preferred commercially available (meth)acrylated silicone surfactants include: Ebecryl™ 350, a silicone diacrylate from Cytec; the polyether modified acrylated polydimethylsiloxane BYK™ UV3500 and BYK™ UV3530, the polyester modified acrylated polydimethylsiloxane BYK™ UV3570, all manufactured by BYK Chemie; Tego™ Rad 2100, Tego™ Rad 2200N, Tego™ Rad 2250N, Tego™ Rad 2300, Tego™ Rad 2500, Tego™ Rad 2600, and Tego™ Rad 2700, Tego™ RC711 from EVONIK; Silaplane™ FM7711, Silaplane™ FM7721, Silaplane™ FM7731, Silaplane™ FM0711, Silaplane™ FM0721, Silaplane™ FM0725, Silaplane™ TM0701, Silaplane™ TM0701T all manufactured by Chisso Corporation; and DMS-R05, DMS-R11, DMS-R18, DMS-R22, DMS-R31, DMS-U21, DBE-U22, SIB1400, RMS-044, RMS-033, RMS-083, UMS-182, UMS-992, UCS-052, RTT-1011 and UTT-1012 all manufactured by Gelest, Inc.

Preparation of Inkjet Inks

The preparation of pigmented radiation curable inkjet inks is well-known to the skilled person. Preferred methods of preparation are disclosed in paragraphs [0076] to [0085] of WO 2011/069943 (AGFA).

Inkjet Printing Methods

A method of inkjet printing in a preferred embodiment of the present invention includes the steps of: a) applying on a substrate a free radical radiation curable inkjet ink having a viscosity smaller than 30 mPa·s at 40° C. and at a shear rate of 1,000 $s^{-1}$ and including a polymeric or polymerizable photoinitiator; a thiol compound; and a vitrification control monomer, wherein the vitrification control monomer includes a (meth)acrylate group and an ethylenically unsaturated functional group selected from the group consisting of a vinyl ether group, an allyl ether group and an allyl ester group; and wherein the thiol compound includes no more than six thiol groups, preferably no more than four thiol groups, and most preferably no more than three thiol groups; and b) at least partially curing the free radical radiation curable inkjet ink.

The free radical radiation curable inkjet ink can be applied by coating or printing, e.g. flexography, but is preferably applied by jetting the free radical radiation curable inkjet ink on the substrate.

The free radical radiation curable inkjet ink is preferably partially cured. By only partially curing, an improved adhesion between liquid and inkjet ink is observed compared to a fully cured liquid.

The terms "partial cure" and "full cure" refer to the degree of curing, i.e., the percentage of converted functional groups, and may be determined by for example RT-FTIR (Real-Time Fourier Transform Infra-Red Spectroscopy) a method well known to the one skilled in the art of curable formulations. A partial cure, also called a pin cure, is defined as a degree of curing wherein at least 5%, preferably at least 10%, of the functional groups in the coated formulation is converted. A full cure is defined as a degree of curing wherein the increase in the percentage of converted functional groups, with increased exposure to radiation (time and/or dose), is negligible. A full cure corresponds with a conversion percentage that is within 10%, preferably within 5%, from the maximum conversion percentage defined by the horizontal asymptote in the RT-FTIR graph (percentage conversion versus curing energy or curing time).

In a preferred embodiment, the inkjet printing method is performed using an inkjet ink set including at least cyan, magenta, yellow and black inkjet inks.

In a preferred embodiment, the inkjet printing method uses a substrate having a surface selected from the group consisting of polyethylene, polypropylene, polycarbonate, polyvinyl chloride, polyesters like polyethylene terephthalate (PET), polyethylene naphthalate (PEN) and polylactide (PLA), and polyimide. The free radical radiation curable inkjet ink is applied on the surface of the latter substrates.

The substrate may be (bi)axial oriented, e.g. a biaxial oriented polypropylene.

The end result of the inkjet printing method is preferably a printed packaging material, more preferably a printed packaging material suitable for food packaging. It has been found that a low viscous free radical radiation curable inkjet ink according to preferred embodiments of the present invention exhibits a large improvement in migration through polyolefine substrates such as polyethylene or biaxial oriented polypropylene and very thin PET foils.

Printing Devices

The free radical radiation curable inkjet ink may be jetted by one or more print heads ejecting small droplets in a controlled manner through nozzles onto a substrate, which is moving relative to the print head(s).

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However the inkjet printing method according of the present invention is not restricted to piezoelectric inkjet printing. Other inkjet print heads can be used and include various types, such as a continuous type.

The inkjet print head normally scans back and forth in a transversal direction across the moving ink-receiver surface. Often the inkjet print head does not print on the way back. Bi-directional printing is preferred for obtaining a high areal throughput. Another preferred printing method is by a "single pass printing process", which can be performed by using page wide inkjet print heads or multiple staggered inkjet print heads which cover the entire width of the ink-receiver surface. In a single pass printing process the inkjet print heads usually remain stationary and the substrate surface is transported under the inkjet print heads.

Curing Devices

The free radical radiation curable inkjet ink according to a preferred embodiment of the present invention can be cured by exposing them to actinic radiation, preferably to ultraviolet radiation.

In inkjet printing, the curing device may be arranged in combination with the print head of the inkjet printer, travelling therewith so that the curable liquid is exposed to curing radiation very shortly after been jetted.

In such an arrangement it can be difficult to provide a small enough radiation source connected to and travelling with the print head, such as LED. Therefore, a static fixed radiation source may be employed, e.g. a source of curing UV-light, connected to the radiation source by a flexible radiation conductive device such as a fiber optic bundle or an internally reflective flexible tube.

Alternatively, the actinic radiation may be supplied from a fixed source to the radiation head by an arrangement of mirrors including a mirror upon the radiation head.

The source of radiation may also be an elongated radiation source extending transversely across the substrate to be cured. It may be adjacent the transverse path of the print head so that the subsequent rows of images formed by the print head are passed, stepwise or continually, beneath that radiation source.

Any ultraviolet light source, as long as part of the emitted light can be absorbed by the photo-initiator or photo-initiator system, may be employed as a radiation source, such as, a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:

UV-A: 400 nm to 320 nm
UV-B: 320 nm to 290 nm
UV-C: 290 nm to 100 nm.

In a preferred embodiment, the inkjet printing device contains one or more UV LEDs with a wavelength larger than 360 nm, preferably one or more UV LEDs with a wavelength larger than 380 nm, and most preferably UV LEDs with a wavelength of about 395 nm.

Furthermore, it is possible to cure the image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed and a high curing degree.

For facilitating curing, the inkjet printing device often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

Substrates

There is no real limitation on the type of substrate. The substrates may have ceramic, metallic, paper or polymeric surfaces for printing.

The substrate may be porous, as e.g. textile, paper and card board substrates, or substantially non-absorbing substrates such as e.g. a substrate having a polyethylene-terephthalate surface.

Preferred substrates including surfaces of polyethylene, polypropylene, polycarbonate, polyvinyl chloride, polyesters like polyethylene terephthalate (PET), polyethylene naphthalate (PEN) and polylactide (PLA) and polyimide.

The substrate may also be a paper substrate, such as plain paper or resin coated paper, e.g. polyethylene or polypropylene coated paper. There is no real limitation on the type of paper and it includes newsprint paper, magazine paper, office paper, wallpaper but also paper of higher grammage, usually referred to as boards, such as white lined chipboard, corrugated board and packaging board.

The substrates may be transparent, translucent or opaque. Preferred opaque substrates includes so-called synthetic paper, like the Synaps™ grades from Agfa-Gevaert which are an opaque polyethylene terephthalate sheet having a density of 1.10 g/cm³ or more.

There is no restriction on the shape of the substrate. It can be a flat sheet, such a paper sheet or a polymeric film or it can be a three dimensional object like e.g. a plastic coffee cup. If foodstuffs or pharmaceuticals are to be included as content of the three dimensional object, than preferably diffusion hindered photoinitiators and purified monomers and oligomers are used.

The three dimensional object can also be a container like a bottle or a jerry-can for including e.g. oil, shampoo, insecticides, pesticides, solvents, paint thinner or other type of liquids.

EXAMPLES

Materials

All materials used in the examples were readily available from standard sources such as Sigma-Aldrich (Belgium) and Acros (Belgium) unless otherwise specified.

Sun Fast™ Blue 15:4 is a C.I. Pigment Blue 15:4 pigment from SUN CHEMICAL.

DB 162 is the isolated polymer from Disperbyk™ 162, supplied as a 40% solution in a mixture of 2-methoxy-1-methyl-acetate, xylene and butylacetate by BYK Chemie. The polymer has been isolated by precipitation with iso-octane, followed by washing and drying.

Genorad™ 16 is a stabilizer supplied by Rahn.

VEEA is 2-(2'-vinyloxyethoxy)ethylacrylate, a difunctional monomer available from NIPPON SHOKUBAI, Japan.

2-allyloxyethyl acrylate has been supplied by ABCR.

DISP-1 is a is a cyan pigment dispersion prepared as follows:

A 30 w/w % solution of DB162 in VEEA was prepared. 1 w/w % Genorad™ 16 was added. 1.5 kg Sun Fast™ Blue 15/4 was added to a mixture of 1.95 kg VEEA, 2.5 kg of the DB162 solution and 50 g Genorad™ 16, while stirring with a DISPERLUX™ dispenser. Stirring was continued for 30 minutes. The vessel was connected to a Dynomill™ ECM Pilot mill from the company Willy A. Bachofen (Switzerland), preloaded with 1.5 kg VEEA and filled for 42% with 0.4 mm yttrium stabilized zirconia beads ("high wear resistant zirconia grinding media" from TOSOH Co.). The mixture was circulated over the mill for 5 hours 52 minutes at a flow rate of 1.5 l/min and a rotation speed in the mill of about 13 m/s. During the milling procedure, an additional 2.5 kg of the DB162 solution was added. During the complete milling procedure the content in the mill was cooled to keep the temperature below 40° C. After milling, dispersion 1 was discharged into a 15 L-vessel. The resulting concentrated pigment dispersion DISP-1 according to Table 3 exhibited an average particle size of 85 nm.

TABLE 3

| Component | wt % |
| --- | --- |
| Sun Fast ™ Blue 15/4 | 15 |
| DB162 | 15 |
| Genorad ™ 16 | 1 |
| VEEA | 69 |

TX-1 is a polymerizable thioxanthone, having the following structure:

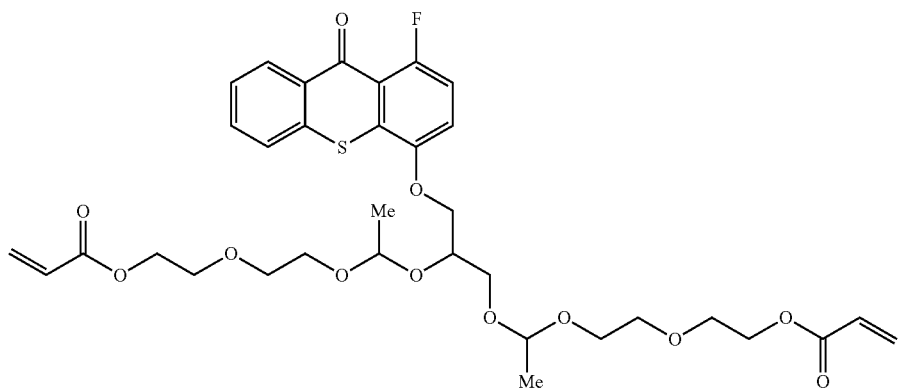 [SMILES: C=CC(=O)OCCOCCOC(C)OCC(COc1ccc(F)c2c(=O)c3ccccc3sc12)OC(C)OCCOCCOC(=O)C=C]

TX-1 has been prepared as disclosed in Example 1c of EP 2444429 A (AGFA) and was used after removal of Lewatit™ as a 25w % solution of acrylic acid 2-(2-{1-[2-(2-acryloyloxy-ethoxy)-ethoxy]-ethoxy}-3-(1-fluoro-9-oxo-9H-thioxanthen-4-yloxy)-propoxy)ethoxyl-ethylester in VEEA.

IC819 is bis(2,4,6-trimethylbenzoyl)-phenylphosphineoxide, a photoinitiator available as Irgacure™ 819 from BASF.

SC7040 is Speedcure™ 7040, a polymeric co-initiator supplied by LAMBSON.

Omnipol™ TX is a polymeric thioxanthone, supplied by IGM.

Speedcure™ 7040 is a polymeric coinitiator, supplied by Lambson.

Type 1 is a polymerizable Norrish type I initiator having the chemical structure:

mmol) BHT were added. The mixture was heated to 70° C. for 16 hours. The reaction mixture was allowed to cool down to room temperature and 100 g activated Lewatit™ M600 MB was added. The reaction mixture was stirred for 1 hour. Lewatit M600 MB was removed by filtration. The ethyl acetate was removed under reduced pressure yielding a 63 wt % solution of Type 1 in VEEA, which was used as such in the free radical radiation curable inkjet inks.

Lewatit™ M600 MB is available from CLEARTECH INDUSTRIES INC.

Activated Lewatit™ M600 MB means that it received an alkaline treatment according to the following method: 25 g of Lewatit™ M600 MB was treated with 75 mL of 1 N sodium hydroxide solution and stirred for 2 hours. The ion exchanger was isolated by filtration, washed several times with water and dried until constant weight.

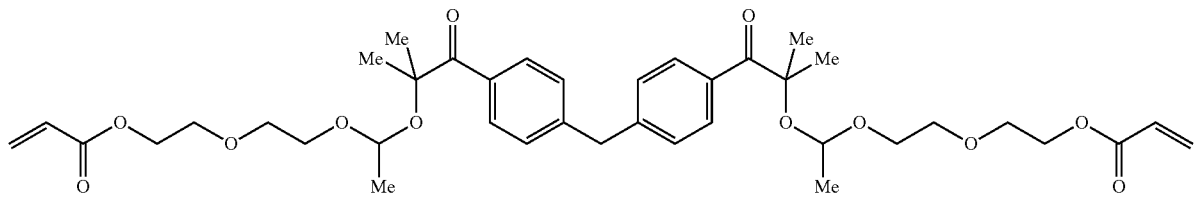

Type I was prepared as follows:

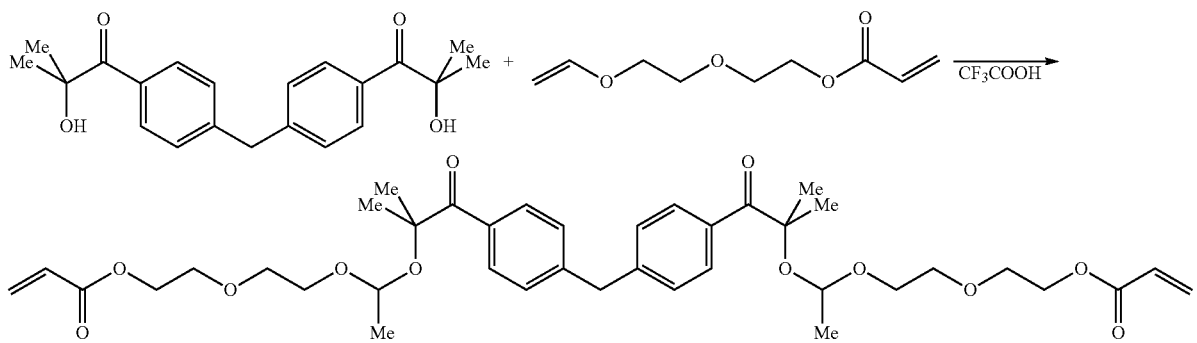

100 g (0.294 mol) Irgacure™ 127, supplied by BASF, was dissolved in 500 ml ethyl acetate. 186 g (1 mol) VEEA, 0.7 g (0.458 ml, 5.9 mmol) trifluoro acetic acid and 1.3 g (5.9

Esacure™ KIP160 is a difunctional α-hydroxyketone available from LAMBERTI and having the chemical structure:

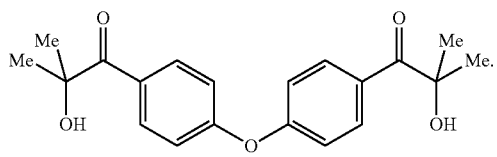 [SMILES: CC(C)(O)C(=O)c1ccc(Oc2ccc(C(=O)C(C)(C)O)cc2)cc1]

Type IB is a polymerizable Norrish type I initiator having the chemical structure:

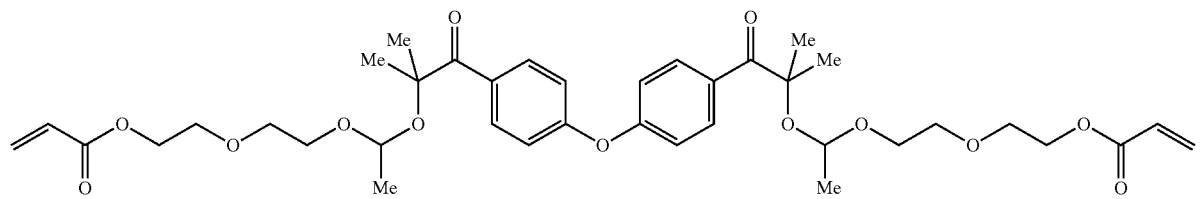 [SMILES: C=CC(=O)OCCOCCOC(C)OC(C)(C)C(=O)c1ccc(Oc2ccc(C(=O)C(C)(C)OC(C)OCCOCCOC(=O)C=C)cc2)cc1]

Type IB was prepared as follows:

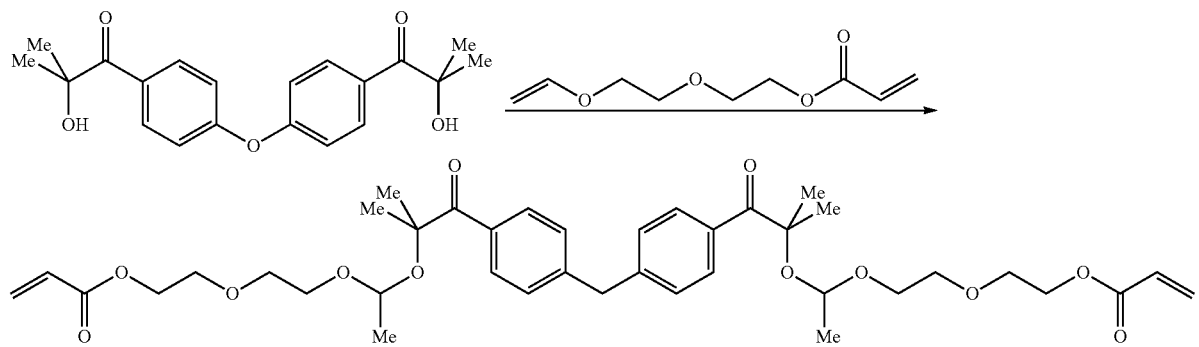

10.26 g (30 mmol) Esacure™ KIP 160, supplied by Lamberti, was added to 41.04 g 2-(2-vinyloxyethoxy)ethyl acrylate. An additional 66 mg (mmol) BHT was added and the mixture was heated to 60° C. 0.428 g poly(4-vinylpyridinium)tosylate was added and the mixture was further heated to 75° C. The reaction was allowed to continue for 24 hours at 75° C. The reaction was allowed to cool down to room temperature and the catalyst was removed by filtration. Type IB was directly used as a solution in 2-(2-vinyloxyethoxy)ethyl acrylate in the inventive and comparative formulation. (TLC-analysis: RP-C18 (Partisil™ KC18F, supplied by Whatman), eluent: MeOH/0.5 M NaCl, Rf=0.33). The concentration was determined by $^1$H-NMR analysis. The concentration was 42 wt %.

Stabilizer is a mixture forming a polymerization inhibitor having a composition:

TABLE 4

| Component | wt % |
| --- | --- |
| DPGDA | 82.4 |
| p-methoxyphenol | 4.0 |
| 2,6-di-tert-butyl-4-methylphenol | 10.0 |
| Cupferron ™ AL | 3.6 |

Cupferron™ AL is aluminum N-nitrosophenylhydroxylamine from WAKO CHEMICALS LTD.

DPGDA is dipropyleneglycoldiacrylate from SARTOMER.

Thiol-1 is 2-ethylhexyl thioglycolate supplied by Aldrich.

Thiol-8 is ethylene glycol bisthioglycolate supplied by Aldrich.

Thiol-3 is trimethylolpropane trimercaptoacetate, available as Thiocure™ TMPMA from Bruno Bock GmbH.

Thiol-7 is pentaerythritol tetramercaptoacetate, available as Thiocure™ PETMA from Bruno Bock GmbH.

PET175 is a 175 μm thick unsubbed polyethylene terephthalate sheet available as Astera™ type U175.332 from AGFA-GEVAERT NV.

Measurement Methods

1. Average particle size

The particle size of pigment particles in a pigment dispersion was determined by photon correlation spectroscopy at a wavelength of 633 nm with a 4 mW HeNe laser on a diluted sample of the pigment dispersion. The particle size analyzer used was a Malvern™ nano-S available from Goffin-Meyvis.

The sample was prepared by addition of one drop of pigment dispersion to a cuvette containing 1.5 mL ethyl acetate and mixed until a homogenous sample was obtained. The measured particle size is the average value of 3 consecutive measurements consisting of 6 runs of 20 seconds.

2. Viscosity

The viscosity of a radiation curable inkjet ink was measured using a Haake Rotovisco RV1 at 40° C. and 1,000 s$^{-1}$.

Example 1

This example illustrates the advantage in viscosity and migration performance of free radical radiation curable inkjet inks according to a preferred embodiment of the present invention.

Preparation of Free Radical Radiation Curable Inkjet Inks

The free radical radiation curable inkjet inks INK-1 to INK-9 were prepared to have a composition according to Table 5 or Table 6. The inkjet inks INK-2, INK-4, INK-6 and INK-8, respectively the inkjet inks INK-3, INK-5, INK-7 and INK-9, include the thiol compound so that the molar concentration of thiol groups in the ink is comparable. The percentages are weight percentages relative to the total weight of the radiation curable inkjet inks. The viscosity of each inkjet ink was determined.

TABLE 5

| wt % of | INK-1 | INK-2 | INK-3 | INK-4 | INK-5 |
|---|---|---|---|---|---|
| DISP-1 | 16.0 | 16.0 | 16.0 | 16.0 | 16.0 |
| TX-1 | 45.0 | 45.0 | 45.0 | 45.0 | 45.0 |
| IC819 | 2.5 | 2.5 | 2.5 | 2.5 | 2.5 |
| SC 7040 | 1.5 | 1.5 | 1.5 | 1.5 | 1.5 |
| Type I | 5.0 | 5.0 | 5.0 | 5.0 | 5.0 |
| Stabilizer | 1.0 | 1.0 | 1.0 | 1.0 | 1.0 |
| VEEA | 29.0 | 24.5 | 20.0 | 26.5 | 24.0 |
| Thiol-1 | — | 4.5 | 9.0 | — | — |
| Thiol-8 | — | — | — | 2.5 | 5.0 |

TABLE 6

| wt % of | INK-6 | INK-7 | INK-8 | INK-9 |
|---|---|---|---|---|
| DISP-1 | 16.0 | 16.0 | 16.0 | 16.0 |
| TX-1 | 45.0 | 45.0 | 45.0 | 45.0 |
| IC819 | 2.5 | 2.5 | 2.5 | 2.5 |
| SC 7040 | 1.5 | 1.5 | 1.5 | 1.5 |
| Type I | 5.0 | 5.0 | 5.0 | 5.0 |
| Stabilizer | 1.0 | 1.0 | 1.0 | 1.0 |
| VEEA | 26.0 | 23.5 | 26.5 | 24.0 |
| Thiol-3 | 3.0 | 5.5 | — | — |
| Thiol-7 | — | — | 2.5 | 5.0 |

Results and Evaluation

The free radical radiation curable inkjet inks INK-1 to INK-9 were coated on a PET175 substrate using a bar coater and a 10 μm wired bar. All coated samples were cured using a Fusion DRSE-120 conveyer, equipped with a Fusion VPS/1600 lamp (D-bulb). The samples were passed under the lamp twice at a belt speed of 70 m/min and at full power of the lamp.

The extractable residues were determined as follows. Two samples of 7.068 $cm^2$ of each of the coated and cured samples of the free radical radiation curable inkjet inks INK-1 to INK-9 were put into a 50 ml beaker and extracted with 4.5 mL acetonitrile, using ultrasound for 30 minutes. The extract was transferred into a 5 mL volumetric flask. The samples were rinsed twice with a small amount of acetonitrile and the rinsing solvent was transferred into the 5 mL volumetric flask until a volume of 5 mL was obtained. The solution was thoroughly mixed and filtered over a 0.2 μm filter (Chromafill M&N). 15 μL of each sample was injected on the HPLC.

The chromatographic method used an Alltima™ C18 5 μm column (150×3.2 mm) supplied by Alltech. A flow rate of 0.5 mL/min was used at a temperature of 40° C. The HPLC trace was run at 204 nm. VEEA eluted at a retention time of 5.02 min. The concentration was determined relative to reference solutions. The HPLC-method used for all samples had an applied gradient with an end run=25 min as given by Table 7. The Eluent A is $CH_3CN$ and the Eluent B is $H_2O$.

TABLE 7

| Time (min) | % eluent A | % eluent B |
|---|---|---|
| 0 | 55 | 45 |
| 6 | 55 | 45 |
| 7 | 0 | 100 |
| 17 | 0 | 100 |
| 18 | 55 | 45 |
| 25 | 55 | 45 |

The amount of extractable VEEA was determined as described above and expressed as food ppb, which was calculated as follows. The amount of VEEA extractable from 14.136 $cm^2$ of each sample is calculated from the analysis and expressed in μg. This is recalculated to 6 $dm^2$ (see paragraph 34 of EU10/2011), which corresponds to the surface area of a box containing one liter of a simulant. The recalculated amount of VEEA, expressed in μg corresponds to the amount that would have been extracted from the total surface area of the box in contact with one liter of the simulant. If the simulant would have a density of one, the extracted amount would correspond to the total amount of VEEA expressed as pg in one kilogram of simulant or ppb. The results of extractable VEEA and ink viscosity are summarized in Table 8.

TABLE 8

| Inkjet Ink | VEEA in food ppb | Viscosity (mPa . s) |
|---|---|---|
| INK-1 | 2460 | 5.74 |
| INK-2 | 913 | 6.74 |
| INK-3 | 455 | 9.75 |
| INK-4 | 567 | 7.17 |
| INK-5 | 398 | 9.97 |
| INK-6 | 648 | 7.64 |
| INK-7 | 236 | 9.82 |
| INK-8 | 983 | 8.91 |
| INK-9 | 631 | 12.27 |

From Table 8, it becomes apparent that the addition of a small amount of thiol compounds significantly increases the conversion of VEEA, while still maintaining a jettable viscosity in the radiation curable compositions. It can also be surprisingly seen that if the number of thiol groups per thiol compound was controlled to be two or three, that simultaneously a better result in extractable VEEA and a lower viscosity was obtained. In addition, almost no odor was perceivable for the cured samples of inkjet inks INK-2 to INK-9.

Example 2

This example illustrates the increased monomer conversion in an allylether-acrylate containing free radical radiation curable inkjet ink.

Preparation of Free Radical Radiation Curable Inkjet Inks

The free radical radiation curable inkjet inks INK-10 and INK-11 were prepared to have a composition according to Table 9. The percentages are weight percentage relative to the total weight of the radiation curable compositions. The viscosity of each inkjet ink was determined.

TABLE 9

| wt % of component: | INK-10 | INK-11 |
|---|---|---|
| DISP-1 | 16.0 | 16.0 |
| Omnipol ™ TX | 5.0 | 5.0 |
| IC819 | 5.0 | 5.0 |
| Speedcure ™ 7040 | 5.0 | 5.0 |
| Type IB | 5.0 | 5.0 |
| Thiol-3 | — | 5.5 |
| 2-allyloxyethyl acrylate | 63.0 | 57.5 |
| Stabilizer | 1.0 | 1.0 |

Results and Evaluation

The free radical radiation curable inkjet inks INK-10 and INK-11 were coated on a PET175 substrate using a bar coater and a 6 μm wired bar. All coated samples were cured were cured using a Fusion DRSE-120 conveyer, equipped with a Fusion VPS/1600 lamp (D-bulb). A first sample of each radiation curable composition was passed under the lamp twice at 70 m/min and at full power of the lamp. A second sample of each radiation curable composition was passed under the lamp twice at a belt speed of 50 m/min and at full power of the lamp.

Two samples of 7.068 cm² of each cured sample were put into a 50 ml beaker and extracted with 4.5 mL acetonitrile, using ultrasound for 30 minutes. The extract was transferred into a 5 mL volumetric flask. The samples were rinsed twice with a small amount of acetonitrile and the rinsing solvent was transferred into the 5 mL volumetric flask until a volume of 5 mL was obtained. The solution was thoroughly mixed and filtered over a 0.2 μm filter (Chromafill M&N). 15 μL of each sample was injected on the HPLC.

The chromatographic method used an Alltima™ C18 5 μm column (150×3.2 mm) supplied by Alltech. A flow rate of 0.5 mL/min was used at a temperature of 40° C. The HPLC trace was run at 204 nm. VEEA and allyloxyethyl acrylate co-eluted at the same retention time. As a consequence, the sum of the extractable amount of VEEA and allyloxyethyl acrylate was determined relative to VEEA standard solutions. The HPLC-method used for all samples had an applied gradient with an end run=25 min as given by Table 10. The Eluent A is CH₃CN and the Eluent B is H₂O.

TABLE 10

| Time (min) | % eluent A | % eluent B |
|---|---|---|
| 0 | 55 | 45 |
| 6 | 55 | 45 |
| 7 | 0 | 100 |
| 17 | 0 | 100 |
| 18 | 55 | 45 |
| 25 | 55 | 45 |

The amount of extractable monomers, determined as described above, are expressed as food ppb, calculated as follows. The amount of monomers, expressed as VEEA equivalents, from 14.136 cm² of each sample is calculated from the analysis and expressed in μg. This is recalculated to 6 dm² (see paragraph 34 of EU10/2011), which corresponds to the surface area of a box containing one liter of a simulant. The recalculated amount of monomers, expressed in pg corresponds to the amount that would have been extracted from the total surface area of the box in contact with one liter of the simulant. If the simulant would have a density of one, the extracted amount would correspond to the total amount of monomers expressed as μg in one kilogram of simulant or ppb.

The results of extractable monomers and ink viscosity are summarized in Table 11.

TABLE 11

| Inkjet ink | Extracted monomers, expressed as VEEA equivalents (Food ppb) | Viscosity (mPa · s) |
|---|---|---|
| INK-10 | 1539 | 4.3 |
| INK-11 | 750 | 7.1 |

From Table 11, it becomes apparent that the addition of small amounts of thiol compounds significantly increases the monomer conversion in allylether acrylate comprising radiation curable formulations, while maintaining a jettable viscosity. In addition, almost no odor was perceivable for the cured sample of inkjet ink INK-11.

The invention claimed is:

1. A free radical radiation curable inkjet ink for food packaging comprising:
   a polymeric or polymerizable thioxanthone photoinitiator;
   an acylphosphine oxide-based polymerization photoinitiator;
   a thiol compound; and
   a vitrification control monomer; wherein
   the vitrification control monomer includes a (meth)acrylate group and an ethylenically unsaturated functional group selected from the group consisting of a vinyl ether group, an allyl ether group, and an allyl ester group;
   the thiol compound includes two or three thiol groups;
   the free radical radiation curable inkjet ink has a viscosity smaller than 30 mPa·s at 40° C. and at a shear rate of 1,000 s⁻¹; and
   the free radical radiation curable inkjet ink does not include an organic acid.

2. The free radical radiation curable inkjet ink according to claim 1, wherein the thiol compound is represented by Formula (I):

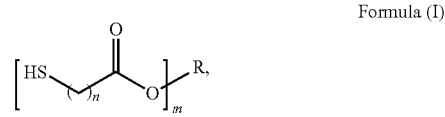

Formula (I)

wherein
   n represents an integer from 1 to 4;
   m represents an integer from 1 to 6; and
   R represents an m-valent linking group including at most 20 carbon atoms.

3. The free radical radiation curable inkjet ink according to claim 1, wherein the vitrification control monomer is represented by a compound according to Formula (II):

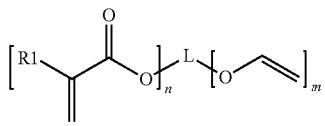

Formula (II)

wherein
R¹ represents hydrogen, or a substituted or unsubstituted alkyl group;
L represents a linking group including at least one carbon atom; and
n and m independently represent a value from 1 to 5.

4. The free radical radiation curable inkjet ink according to claim 2, wherein the vitrification control monomer is represented by a compound according to Formula (II):

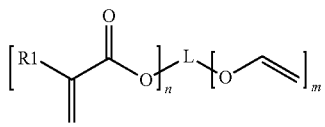

Formula (II)

wherein
R¹ represents hydrogen, or a substituted or unsubstituted alkyl group;
L represents a linking group including at least one carbon atom; and
n and m independently represent a value from 1 to 5.

5. The free radical radiation curable inkjet ink according to claim 1, wherein the vitrification control monomer represents at least 50% by weight of a total monomer composition in the free radical radiation curable inkjet ink.

6. The free radical radiation curable inkjet ink according to claim 1, wherein the thiol compound has a molecular weight smaller than 1,000 Dalton.

7. The free radical radiation curable inkjet ink according to claim 4, further comprising a colorant.

8. A free radical radiation curable ink jet ink set comprising at least one free radical radiation curable inkjet ink as defined by claim 1.

9. A substrate comprising a cured layer of the free radical radiation curable inkjet ink as defined by claim 1.

10. The substrate according to claim 9, wherein the substrate is a food packaging material.

11. A method of inkjet printing on a food packaging material, the method comprising the steps of:
applying on a substrate a free radical radiation curable inkjet ink for food packaging including a polymeric or polymerizable thioxanthone photoinitiator, an acylphosphine oxide-based polymerization photoinitiator, a thiol compound, and a vitrification control monomer; and
at least partially curing the free radical radiation curable inkjet ink; wherein
the vitrification control monomer includes a (meth)acrylate group and an ethylenically unsaturated functional group selected from the group consisting of a vinyl ether group, an allyl ether group, and an allyl ester group;
the thiol compound includes two or three thiol groups;
the free radical radiation curable inkjet ink has a viscosity smaller than 30 mPa·s at 40° C. and at a shear rate of 1,000 s$^{-1}$; and
the free radical radiation curable inkjet ink does not include an organic acid.

12. The method of inkjet printing according to claim 11, wherein the free radical radiation curable inkjet ink is applied on a surface of the substrate, and the surface includes a polymer selected from the group consisting of polyethylene, polypropylene, polycarbonate, polyvinyl chloride, polyethylene terephthalate, polyethylene naphthalate, polylactide, and polyimide.

13. The method of inkjet printing according to claim 11, wherein the step of applying the free radical radiation curable inkjet ink on the substrate includes jetting the free radical radiation curable inkjet ink on the substrate.

14. The method of inkjet printing according to claim 11, wherein the substrate is the food packaging material.

15. The free radical radiation curable inkjet ink according to claim 3, wherein the substituted or unsubstituted alkyl group is a methyl group.

16. The free radical radiation curable inkjet ink according to claim 4, wherein the substituted or unsubstituted alkyl group is a methyl group.

* * * * *